(No Model.)
H. G. HUNTINGTON.
AUTOMATIC GATE.
No. 465,110. Patented Dec. 15, 1891.
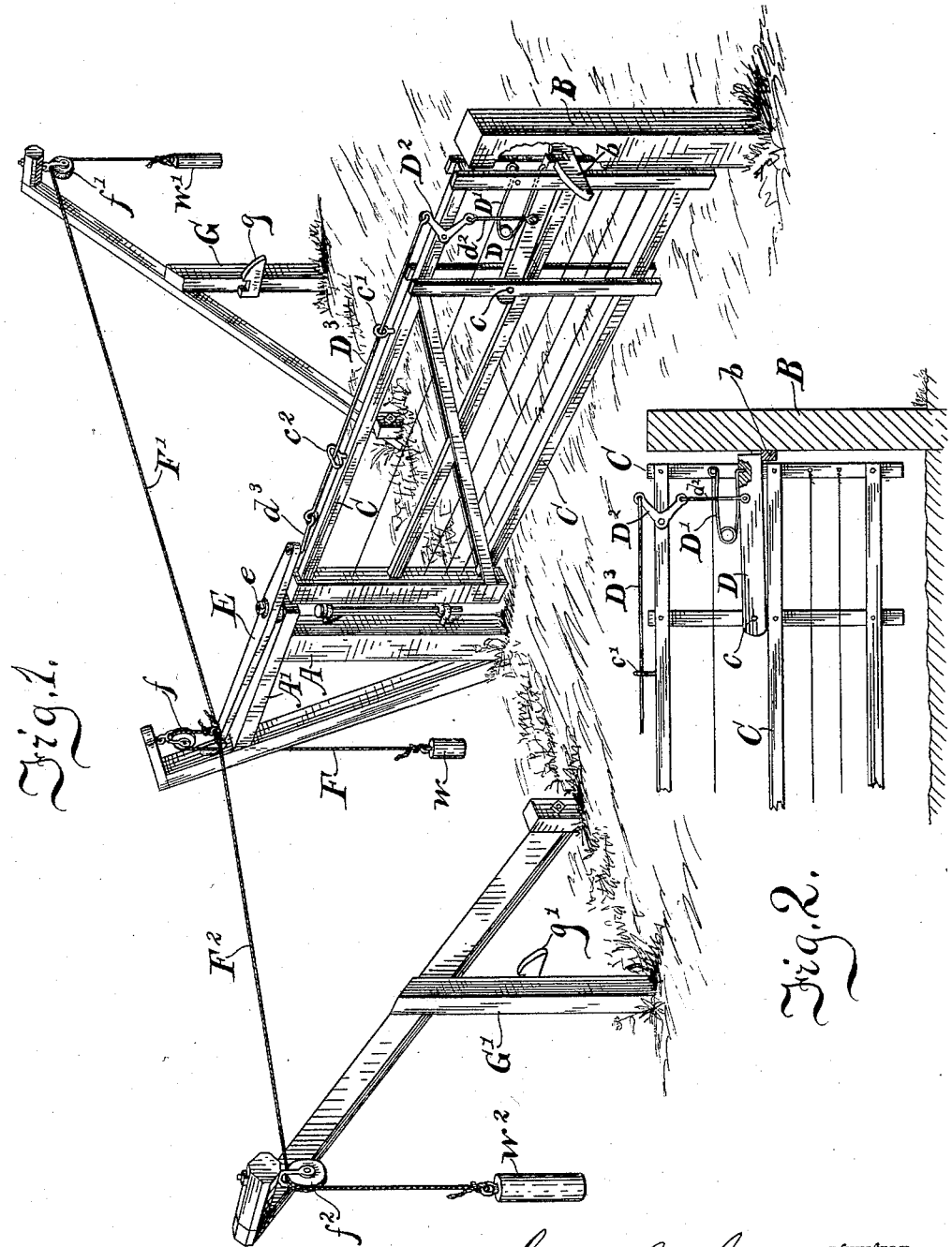
WITNESSES.
Chas. N. Leonard.
Frank H. Wood.
INVENTOR.
Harry G. Huntington,
per C. & E. W. Bradford,
ATTORNEYS.

UNITED STATES PATENT OFFICE.

HARRY G. HUNTINGTON, OF LADOGA, INDIANA, ASSIGNOR OF ONE-HALF TO WILLIE A. WILHITE, OF SAME PLACE.

AUTOMATIC GATE.

SPECIFICATION forming part of Letters Patent No. 465,110, dated December 15, 1891.

Application filed January 27, 1891. Serial No. 379,283. (No model.)

*To all whom it may concern:*

Be it known that I, HARRY G. HUNTINGTON, a citizen of the United States, residing at Ladoga, in the county of Montgomery and State of Indiana, have invented certain new and useful Improvements in Automatic Gates, of which the following is a specification.

My said invention relates to that class of gates which are adapted to be opened or closed in either direction by pulling on a cord or rod running from a lever which operates the gate to a position convenient to the person passing through, usually a rider or a driver of a vehicle.

Referring to the accompanying drawings, which are made a part hereof, and on which similar letters of reference indicate similar parts, Figure 1 is a perspective view of a gate with its posts and mechanism embodying my said invention, and Fig. 2 a detail sectional view showing more clearly the latch mechanism.

In said drawings the portions marked A and B represent the ordinary gate-posts; C, the gate structure; D, the gate-latch; E, the lever by which the gate is operated; F F′ F², cords running from said lever, and G G′ the posts against which the gate swings when opened.

The post A sustains the gate and the operating-lever, and the post B carries the catch $b$ for the gate-latch with which said gate-latch is adapted to engage when it swings against it from either direction.

The gate C is mounted upon the post A by suitable hinges, and is adapted to be swung in either direction from a closed to an open or from an open to a closed position.

The latch D is pivoted to the gate C by a pivot $c$, and extends through the front upright of said gate, and is adapted to engage with the catch $b$ on the post B. A spring D′ holds it down and insures its engagement with said catch. A bell-crank lever D² is pivoted to the gate above the latch, and said latch is connected thereto by a link or rod $d^2$. To the other arm of said bell-crank lever is connected a rod D³, which runs back through eyes $c'$ $c^2$ on top of the gate to near the lever E, to the short end of which it is connected by a link $d^3$.

The lever E is secured to a cap A′ on the post A by a pivot $e$, which pivot is above and preferably directly in line with the hinge-pintles. The short end of this lever extends forward over the gate and is connected by the link $d^3$ to the rod D³, as has been described. Its long arm extends back and is connected to the cords F F′ F². Said cords are connected to the end of the lever, as stated, and two of them F′ F² run, respectively, off from the gate alongside and parallel with the road which the gate shuts, and pass over pulleys $f'$ $f^2$, which are suspended upon suitable timbers or posts, as shown. Upon the ends of these cords are small weights $w'$ $w^2$, which serve to hold the cords taut when not in use. The third cord F runs back in a direction in line with the gate when closed over a pulley $f$ (supported by a suitable timber or post) and hangs down in the position shown. It is provided with a small weight $w$, which operates through said cord to hold the lever E in position to be operated upon by the cords F′ F², as will be readily understood. Except for this, said lever might get in line with said cords F′ and F², and thus be on a "dead-center" relatively to said cords when the gate is open, and thus defeat the operation.

The posts G G′ carry catches $g$ $g'$, which hold the gate in its open position. They may also assist in supporting the timbers to which the pulleys $f'$ $f^2$ are suspended.

The operation is, supposing the gate to be closed, that the person who desires to open it pulls upon one of the cords F′ or F², which, through the lever E, the link $d^3$, rod D³, bell-crank lever D², and link $d^2$, raises the latch D out of engagement with the catch $b$. By this time there is considerable tension on the parts, and when the latch is released the gate is caused to fly open and the latch engages with one of the catches $g$ or $g'$. When the person has passed, he pulls the other cord, and the operation is reversed and the gate closes.

Having thus fully described my said invention, what I claim as new, and desire to secure by Letters Patent, is—

1. The combination, in an automatic gate, of the posts A and B, the gate C, hinged to the post A, a catch therefor on the post B, a latch D, adapted to engage with said catch, a spring D′, by which said latch is held in engagement, a bell-crank lever on said gate, a connection between said bell-crank lever and said catch, an operating-lever E, a connection $d^3$ between said operating-lever and said bell-crank lever, and means consisting of pull-cords running in each direction from said operating-lever and a third cord running therefrom and carrying a weight, whereby said operating-lever is moved, and the gate thus operated, substantially as set forth.

2. The combination, with the operating-lever, of an automatic gate pivoted to the gate-post above the hinge and adapted to be operated by cords running in either direction alongside the roadway, and a third cord running back from said operating-lever and carrying a weight, whereby said operating-lever is held into operative position, substantially as set forth.

In witness whereof I have hereunto set my hand and seal, at Indianapolis, Indiana, this 23d day of January, A. D. 1891.

HARRY G. HUNTINGTON. [L. S.]

Witnesses:
 CHESTER BRADFORD,
 FRANK W. WOOD.